United States Patent
Eastlake, III (10) Patent No.: US 11,184,283 B2
(45) Date of Patent: Nov. 23, 2021

(54) SERVICE FUNCTION CHAINING CONGESTION TRACKING

(71) Applicant: Futurewei Technologies, Inc., Plano, TX (US)

(72) Inventor: Donald Eggleston Eastlake, III, Davenport, FL (US)

(73) Assignee: Futurewei Technologies, Inc., Plano, TX (US)

( * ) Notice: Subject to any disclaimer, the term of this patent is extended or adjusted under 35 U.S.C. 154(b) by 173 days.

(21) Appl. No.: 16/140,085

(22) Filed: Sep. 24, 2018

(65) Prior Publication Data

US 2019/0260679 A1    Aug. 22, 2019

Related U.S. Application Data

(60) Provisional application No. 62/633,960, filed on Feb. 22, 2018.

(51) Int. Cl.
| | | |
|---|---|---|
| *H04L 12/803* | (2013.01) | |
| *H04L 29/06* | (2006.01) | |
| *H04L 12/801* | (2013.01) | |
| *H04L 12/865* | (2013.01) | |

(52) U.S. Cl.
CPC ............ *H04L 47/122* (2013.01); *H04L 47/11* (2013.01); *H04L 69/22* (2013.01); *H04L 47/6275* (2013.01)

(58) Field of Classification Search
None
See application file for complete search history.

(56) References Cited

U.S. PATENT DOCUMENTS

| | | | |
|---|---|---|---|
| 2015/0365322 A1 | 12/2015 | Shatzkamer et al. | |
| 2016/0065456 A1* | 3/2016 | Muley | H04L 12/14 |
| | | | 370/392 |
| 2019/0081894 A1* | 3/2019 | Yousaf | H04L 45/38 |
| 2019/0182161 A1* | 6/2019 | Ravi | H04L 47/11 |

FOREIGN PATENT DOCUMENTS

| | | | |
|---|---|---|---|
| CN | 104869065 A | 8/2015 | |
| CN | 105451207 A | 3/2016 | |
| CN | 106209419 A | 12/2016 | |
| EP | 3258658 A1 | 12/2017 | |
| WO | WO-2017023741 A1 * | 2/2017 | H04W 88/16 |
| WO | WO-2017023741 A1 | 2/2017 | |

OTHER PUBLICATIONS

"International Application No. PCT/CN2019/075312, International Search Report and Written Opinion dated May 17, 2019", (May 17, 2019), 9 pgs.
"Chinese Application No. 201980014347.2, First Office Action dated Apr. 15, 2021", (Apr. 15, 2021), 21 pgs.
"European Application No. 19757760.4, Extended European Search Report dated Jan. 12, 2021", (Jan. 12, 2021), 8 pgs.

* cited by examiner

*Primary Examiner* — Adnan Baig
(74) *Attorney, Agent, or Firm* — Schwegman Lundberg & Woessner, P.A.

(57) ABSTRACT

A computer-implemented method tracks congestion in a service function chain. The method includes receiving a packet at a service function forwarding node of the service function chain, the packet having an information packet, a transport header, and a network service header, forwarding the packet to a service function in accordance with the network service header, detecting congestion, and updating a congestion field in the network service header to indicate congestion was encountered in the service function chain.

16 Claims, 5 Drawing Sheets

SERVICE FUNCTION CHAINING CONGESTION TRACKING

CROSS-REFERENCE TO RELATED APPLICATION

This application claims priority to U.S. Provisional Application Ser. No. 62/633,960 (Service Function Chaining Congestion Tracking, filed Feb. 22, 2018) which is incorporated herein by reference.

TECHNICAL FIELD

The present disclosure is related to service function chaining, and in particular to tracking congestion in a service function chain.

BACKGROUND

Packets progressing through a network of nodes may be processed via service function chaining. Service function chaining results in certain nodes in the network performing functions related to the packets, such as firewalls, network address translation (NAT), and load balancers for example. A network service header (NSH) may be used to control the sequence of service functions to be performed. Sometimes network congestion can slow the progress, and even result in the deletion of a packet, which can result in slow transfer of a packet, retransmission of the packet from a source to a target via the network of nodes, or even loss of the data in the packet.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer-implemented method tracks congestion in a service function chain. The method includes receiving a packet at a service function forwarding node of the service function chain, the packet having an information packet, a transport header, and a network service header, forwarding the packet to a service function in the service function chain in accordance with the network service header, detecting congestion exists in the service function chain, and updating a congestion field in the network service header to indicate congestion was encountered in the service function chain.

Optionally, in any of the preceding aspects, a further implementation of the aspect includes wherein the congestion field comprises two bits in the network service header of the packet.

Optionally, in any of the preceding aspects, a further implementation of the aspect includes wherein at least one non-zero bit in the congestion field signifies that congestion tracking is active for the packet.

Optionally, in any of the preceding aspects, a further implementation of the aspect includes wherein updating the congestion field comprises incrementing a value represented by the congestion field, and wherein a higher congestion field value indicates higher congestion.

Optionally, in any of the preceding aspects, a further implementation of the aspect includes wherein the network service header includes a service path identifier specifying a service path through the service function chain.

Optionally, in any of the preceding aspects, a further implementation of the aspect includes wherein the service path identifier is modifiable to specify a different service path responsive to the congestion field being representative of congestion.

Optionally, in any of the preceding aspects, a further implementation of the aspect includes wherein the service function forwarding node is coupled to multiple instances of service function nodes for performing service on the packet.

Optionally, in any of the preceding aspects, a further implementation of the aspect includes wherein the service, function chain comprises a first node that receives a packet to be transferred between a source and a target, wherein the first node creates the network service header, and a last node that strips off the network service header and communicates the indication of congestion hack toward the first node.

Optionally, in any of the preceding aspects, a further implementation of the aspect includes wherein the first node modifies a path of the packet through the service function chain as a function of the indication of congestion.

According to one aspect of the present disclosure, a device includes a memory storage comprising instructions and one or more processors in communication with the memory storage. The one or more processors execute the instructions to perform operations for tracking congestion in a service function chain, the method including receiving a packet at a service function forwarding node of the service function chain, the packet having an information packet, a transport header, and a network service header, forwarding the packet to a service function in the service function chain in accordance with the network service header, detecting congestion exists in the service function chain, and updating a congestion field in the network service header to indicate congestion was encountered in the service function chain.

Optionally, in any of the preceding aspects, a further implementation of the aspect includes wherein the congestion field comprises two bits in the network service header of the packet.

Optionally, in any of the preceding aspects, a further implementation of the aspect includes wherein at least one non-zero bit in the congestion field signifies that congestion tracking is active for the packet.

Optionally, in any of the preceding aspects, a further implementation of the aspect includes wherein updating the congestion field comprises incrementing a value represented by the congestion field, and wherein a higher congestion field value indicates higher congestion.

Optionally, in any of the preceding aspects, a further implementation of the aspect includes wherein the network service header includes a service path identifier specifying a service path through the service function chain wherein the service path identifier is modifiable to specify a different service path responsive to the congestion field being representative of congestion.

Optionally, in any of the preceding aspects, a further implementation of the aspect includes wherein the service function forwarding node is coupled to multiple instances of service function nodes for performing service on the packet.

Optionally, in any of the preceding aspects, a further implementation of the aspect includes wherein the service function chain comprises a first node that receives a packet to be transferred between a source and a target, wherein the first node creates the network service header, and a last node that strips off the network service header and communicates the indication of congestion hack toward the first node and wherein the first node modifies a path of the packet through the service function chain as a function of the indication of congestion.

According to one aspect of the present disclosure, a non-transitory computer-readable media stores computer instructions for tracking congestion in a service function chain, that when executed by one or more processes, cause the one or more processors to perform the steps of receiving a packet at a service function forwarding node of the service function chain, the packet having an information packet, a transport header, and a network service header, forwarding the packet to a service function in the service function chain in accordance with the network service header, detecting congestion exists in the service function chain, and updating a congestion field in the network service header to indicate congestion was encountered in the service function chain.

Optionally, in any of the preceding aspects, a further implementation of the aspect includes wherein the congestion field comprises two bits in the network service header of the packet, wherein at least one non-zero bit in the congestion field signifies that congestion tracking is active for the packet, and wherein updating the congestion field comprises incrementing a value represented by the congestion field, and wherein a higher congestion field value indicates higher congestion.

Optionally, in any of the preceding aspects, a further implementation of the aspect includes wherein the network service header includes a service path identifier specifying a service path through the service function chain wherein the service path identifier is modifiable to specify a different service path responsive to the congestion field being representative of congestion.

Optionally, in any of the preceding aspects, a further implementation of the aspect includes wherein the service function chain comprises a first node that receives a packet to be transferred between a source and a target, wherein the first node creates the network service header, and a last node that strips off the network service header and communicates the indication of congestion hack toward the first node and wherein the first node modifies a path of the packet through the service function chain as a function of the indication of congestion.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Packets progressing through a network of nodes may be processed via service function chaining. Service Function Chaining (SFC) is a technique for directing network packets through a series of functions, such as firewalls, network address translators (NATs), load balancers, and other services. The Internet Engineering Task Force (IETF) has standardized an architecture for accomplishing this in IETF RFC 7665. A network service header (NSH) may be used to control the sequence of service functions to be performed. Sometimes network congestion can slow the progress, and even result in the deletion of a packet, which can result in slow transfer of a packet, retransmission of the packet from a source to a target via the network of nodes, or even loss of the data in the packet.

The IETF has standardized the NSH as documented in IETF RFC 8300 "Network Service Header (NSH)." The NSH was originally specified in connection with Service Function Chaining (SFC) as specified in IETF RFC 7665 "Service Function Chaining (SFC) Architecture". However, the use of NSH is not restricted to SFC.

Figure 1:
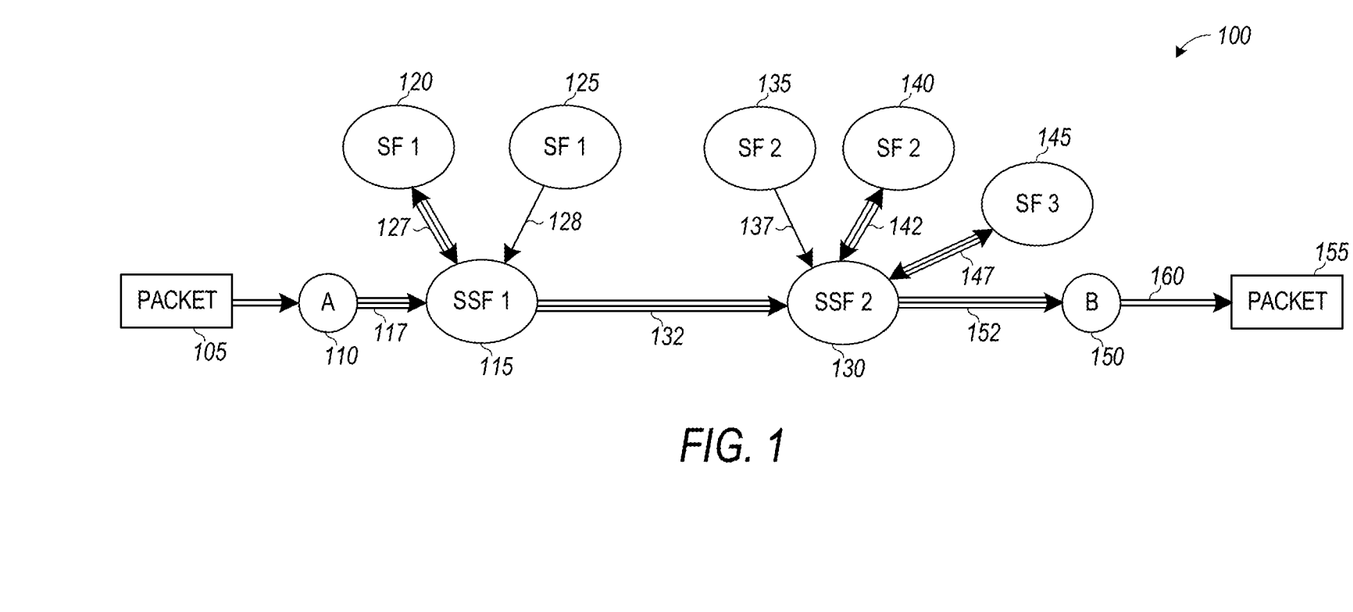
FIG. 1 is a representation of an example network illustrating a service function chain path of a packet through multiple nodes of the network according to an example embodiment.

FIG. 1 is a representation of a simple example network 100 illustrating a path of a packet 105 through multiple nodes of the network. Note that in some embodiments, there may be hundreds of nodes with multiple different available paths through the network. The packet 105 may be received in one embodiment at a first node 110. The packet 105 may have originated at a source and may designate a target in a network transport header. The first node A at 110 performs a service classification function by creating a network service header that is added to the packet 105. The network service header contains information to control processing performed on the packet as the packet progresses through nodes of the network, such as in accordance with IETF RFC 8300. In addition, the NSH is modified, using fields of the NSH designated in RFC 8300 as unused, to indicate that congestion tracking is to be performed by the nodes of the network.

In one embodiment, the packet is then forwarded to a first service forwarding node SFF 115 via connection 117. Lines represent links or connections between various nodes in the network 100. Connection 117 is illustrated with three parallel lines, indicating that service functions are to be performed on the packet by one or more downstream nodes. Similar representations are used for transfer between nodes where service functions are to be performed. First SFF 115 is coupled to multiple instances of a first service function SF 120 and 125. The service functions in one embodiment are stateless, and thus, any instance of the desired service function may be used. SFF 115 in this example forwards the packet to SF 120 for performing a service function, as indicated by connection 127. The service is performed and the packet, modified or unmodified, may be returned to SSF 115.

Some services may discard the packet, and others may return multiple packets to SFF 115, depending on the service or services performed. Note that SFF 115 could alternatively send the packet to SF 125 via connection 128. Multiple SF instances that perform the same service function can be used to ensure sufficient resources are available for performing service functions for SFF 115. The selection of the SF instance in one embodiment is left to SFF 115. In further embodiments, SF instances may be specified in the NSH.

The SFF and SF may be separate devices, although in some embodiments, they could be separate processes or virtual machines (VMs) on one device. An SFF may be a very simple packet forwarding device that just sends packets responsive to the NSH. SFs are typically more complex and might be stateful or stateless. For stateless SFs, the SFF can choose any instance. For stateful SFs, the packets in a flow should be directed to the same SF. Such directions may be encoded in the NSH. SFFs do not need to know which SFs are stateful and which are not. The SFF just looks up a field in the NSH and an index in a local table and forwards the packet however that table entry indicates.

SFF1 115 and/or SF 120 keep track of congestion during the performing of services. Congestion may be detected in response to forwarding the packet to a service function. Forwarding a packet to the service function involves sending the packet to an output queue for a port, or to multiple different packet priority output queues for different respective ports. Congestion may be detected as a function of the size of output queues of packets for services to be performed, a length of time the packet is in the queue, and a length of time between receiving the packet and forwarding the packet to the output queue or queues for different ports responsive to completion of the services.

Figure 2:
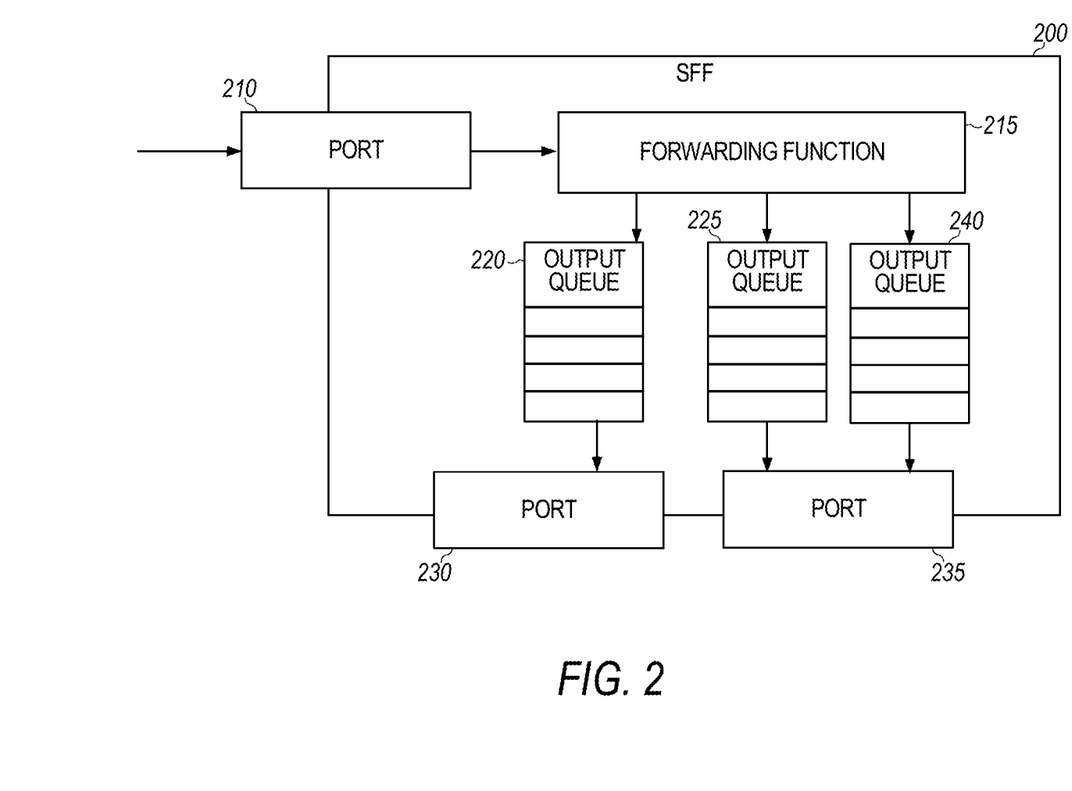
FIG. 2 is a block diagram of an example service forwarding node.

FIG. 2 is a block diagram of an example SFF 200. An input port 210 receives packets from a previous node. A forwarding function 215 receives the packets and places the packet on one or more output queues 220, 225, each associated with a respective output port 230, 235. One or more output ports may have two or more output queues in various embodiments. For example, additional output queue 240 is shown as feeding output port 235. Where an output port has multiple output queues, the queues may have different priorities.

In one embodiment, congestion is detected by there being more than some threshold number of packets already in an SFF node output queue 220, 225, 240 for a port when the packet in question is added. There may be multiple queues for different priority classes of packets. There may be a threshold for each queue. The threshold may be different or the same for each of the varied priority packet queues, allowing congestion detection for each packet priority level. After a packet is transmitted out the port 230, 235, 240 from an output queue 220, 225, 240, the next packet to send may be taken from the highest priority queue, and when that queue is empty from a lower priority queue. Other methods of selecting packets from the queues may be used in further embodiments.

One or more bits in the NSH may be updated to reflect congestion experienced by the packet with that NSH. These bits, or another type of representation of congestion, may be accumulated and studied to determine future changes in network equipment and capacity or fed back to the Node A 110 for reconfiguring the path of future packets to avoid congestion.

In one embodiment, congestion tracking may also utilize Explicit Congestion Notification (ECN) using two bits in the NSH Header in a similar manager to that in which two bits in the IP portion of the transport header are used as specified in IETF RFC 3168, "The Addition of Explicit Congestion Notification (ECN) to IP." Tracking congestion using bits in the NSH allows the tracking of congestion in the SEC domain, ensuring the two-bit indication or representation of congestion is only related to congestion in the SFC domain and not prior to entering the SEC domain at node A. The representation of congestion is communicated forward in the path. The number of bits used to represent congestion may be more than two in further embodiments.

Referring again to FIG. 1, following completion of the service, SEE 115 forwards the packet to a second service function forwarding node SEE 130 via connection 132. SFF has two instances of second service functions SF 135 coupled via connection 137 and SF 140 coupled via connection 142. Connection 142 is used by SEE 130 to have services performed by SE 140 on the packet, which is then returned to SEE 130. A third service function SE 145 is also coupled via connection 147 and performs the third service function SF. Multiple instances of third service function SEF 145, as well as instances of further service functions may be coupled SEE nodes in further embodiments. Note that both connection 142 and 147 are illustrated with three parallel lines indicative of service functions remaining to be performed on the packet.

Responsive to completion of the second and third service functions, SFF 130 forward the packets on to a last node B 150 via connection 152. Connections 117 and 152 each have two parallel lines. Thus, connections with multiple parallel lines are indicative of the path taken by the packet. Last node B 150 strips off the NSH and extracts the one or more bits reflecting congestion. The last node 150 may accumulate congestion indications for study or feed congestion information back to first node A 110 by one of many means. Last node B 150 may forward the serviced packet 155 via connection 160 to the target. In some embodiments, first node A 110 and last node B 150 may also operate as service function forwarding nodes.

First node A 110 may use the congestion information to send a signal back to the source of packets to restrain some flows of packets or modify the NSH added to packet 105 to specify a different path, which may have less congestion, permitting a faster flow of packets.

In some embodiments, multiple packets from a source should have the same sequence of service functions performed. The source may specify the sequence in setting up communications with the first node A 110 on a selected port. First node A 110 may then use a table of service functions for packets received on various ports and from various sources. When one route used by first node A 110 becomes congested, as indicated by the congestion information, packets received from other sources or from that source, as indicated by arrival at first node A 110 on the selected port, may be rerouted through a different path with one or more different SFFs that might not be as congested, but provide the same service functions in the same order. Feedback provided by the congestion information from packets having already traveled the path can be used to find better paths that result in faster processing of the packets and fewer dropped packets.

Figure 3:
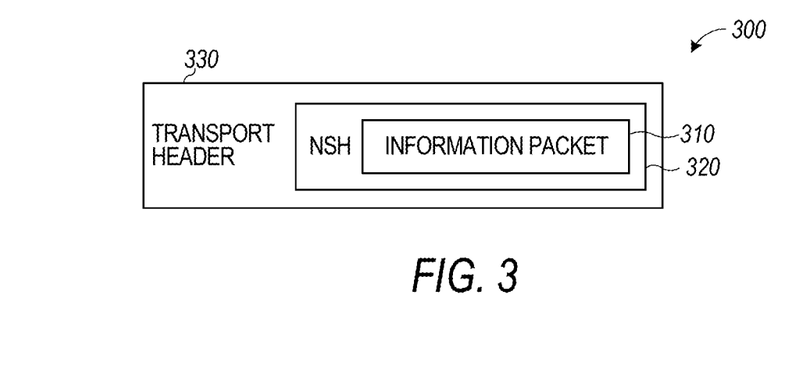
FIG. 3 is a block diagram illustration of an example network service header encapsulated packet according to an example embodiment.

FIG. 3 is a block diagram illustration of an example encapsulated packet 300. Packet 300 includes an information packet 310 and a transport header 330 as received at first node A 110. The transport header 330 encapsulates an NSH header 320, which in turn encapsulates the information packet 310. The NSH header 320 provides a variety of facilities for controlling and monitoring the progress of the packet 300 through succeeding nodes until, at some later node, last node B 150, the packet 300 is de-capsulated, removing the NSH header 320. The NSH header 320 is even capable of assisting in steering a packet on a path that visits a particular node (or multiple nodes) more than once before the packet's ultimate disposition. The transport header 330 may contain addressing and/or other control information related to the Transport Layer of the OSI (open system interconnection) network layer model. For example, the transport header may be an Internet Protocol version 4 (IPv4) or Internet Protocol version 6 (IPv6) header.

Figure 4:
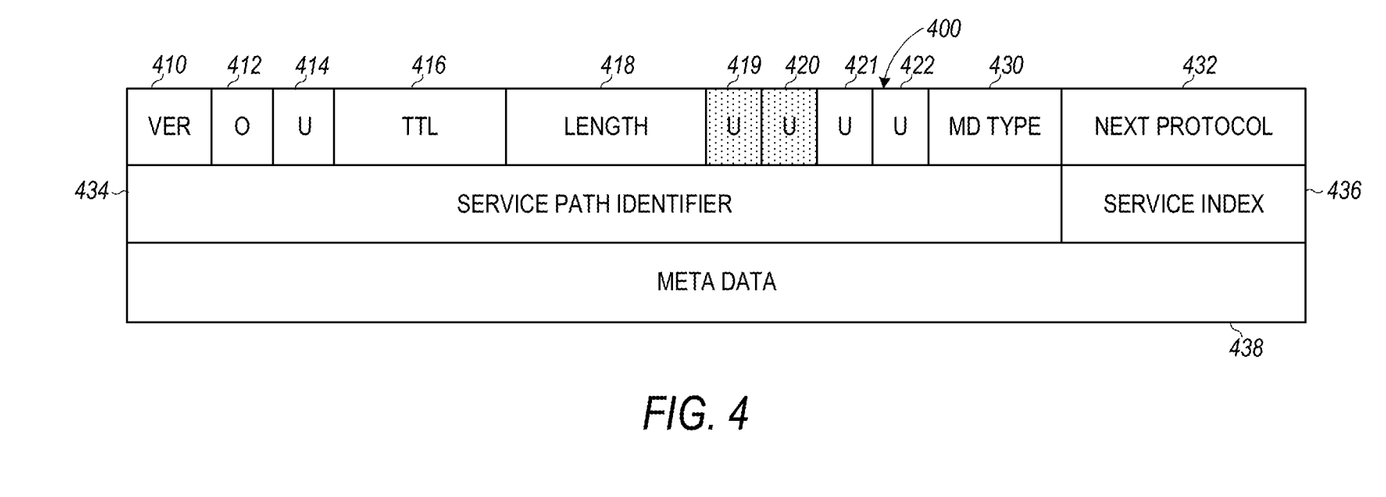
FIG. 4 is a block diagram illustration of an example network service header according to an example embodiment.

FIG. 4 is a block diagram illustration of an example NSH header at 320. The example shown is consistent with the IETF RFC 8300 NSH specification but may vary in further embodiments. The example NSH header 320 is provided to illustrate how some unused fields are used to signify that congestion tracking in the NSH should be performed and are modified by service function forwarders and/or service functions to identify congestion. First, the fields are generally described, followed by an identification of how selected fields are used to both indicate that NSH based congestion tracking should be performed and indicated.

The meaning of the various NSH fields is as follows:

Ver field 410 indicates the NSH version—only version zero is currently specified or used.

O field 412 is one bit that, when its value is one, indicate the packet is an OAM packet that requires certain OAM handling.

The five fields labeled "U" 414, 419, 420, 421, and 422 are each one bit and are currently unspecified and are required to be sent as zero in the RFC 8300 specification. Their value is required to be ignored on receipt by a node that recognizes and processes the currently specified NSH. The use of two or more of the currently unspecified fields for congestion is described below.

TTL 416 field is for loop prevention and is decremented at each node that processes NSH headers. The encapsulated packet is discarded if TTL is zero.

Length field 418 is the length of the NSH in units of 4-byte words.

MD Type field 430 is the type of the variable length MD Data that appears at the end of the NSH.

Next Protocol field 432 indicates the protocol type of the information packet following the NSH or the initial part of that information packet. Typically, the Transport Header filed 330 in FIG. 3 indicates the protocol type for the information packet or the initial part of the information packet. When the NSH is added, the Transport Header 420 is changed to indicate that the data after the Transport Header begins with the NSH and the indication of the packet content protocol type that had been in the Transport Header before the addition of the NSH is put in the "Next Protocol" field of the NSH. This is reversed when the packet is de-capsulated and the NSH is removed, that is, the protocol type indication in the Next Protocol field of the NSH being removed is put into the Transport Header.

Service Path Identifier field 434 and Service Index field 436 may be used in conjunction with controlling the packet's processing and path through the network. In general, Service Index field 436 is incremented at each node that processes the packet's NSH.

Meta Data field 438 is variable length information of the type giving by MD Type field 430 that can serve a variety of purposes. The content of the NSH before the variable length "Meta Data" is of a fixed 8-byte length.

One or more of the five currently unused NSH bits, 414, 419, 420, 421, 422 labeled "U", may be used to provide Explicit Congestion Notification (ECN) at the NSH level. Typically, ECN is provided using two bits as specified in IETF RFC 3168. RFC 3168 "The Addition of Explicit Congestion Notification (ECN) to IP" uses two hits in the Internet Protocol header (either IPv4 or IPv6) and a similar 2-bit encoding may be used in the NSH. However, more bits could be used in further embodiments, which would allow more information to be encoded about congestion encountered.

ECN, as used at the Internet Protocol or transport level, provides an indication to the destination as to whether ECN is supported and whether congestion was encountered along the path from the source to the destination by a node that supports ECN. Last node B 150, where the NSH is removed can then notify human or automated network management of the congestion encountered and can propagate the further downstream if congestion marking is supported in the transport header used for the further downstream traffic.

The benefits of adding ECN to NSH are greater than might be expected. Adding ECN to NSH provides signaling of congestion encountered at nodes supporting ECN that are between the node where the NSH is added to the packet and the node where the NSH is removed from the packet. In the SFC case, adding ECN to NSH also provides a congestion indication to the SFF for any SF that supports NSH ECN. In cases where multiple instances of the same SF attached to an SFF, this congestion information from NSH ECN can be used by the SFF to actively even out the load between instances of an SF. Also, the SFF can, using some management channel, signal the SFC (Service Function Classifier) if all instances of an SF attached to that SFF are busy so that, if that SF is available from other SFFs, the SFC can construct NSHs for packets that need that SF using such other SFFs.

In one embodiment, two bits are used in the NSH for congestion tracking. If either bit is non-zero, congestion tracking is performed by the SFFs. If congestion is detected by any SFF in the path of the packet, the other bit may also be set to a non-zero value, such as 1. The value of 11 in the two bits signifies congestion. The values may take on different means in different embodiments. For example, the first bit may signify whether or not to perform congestion detection. If set to 1, detection is performed. If congestion is detected, the hits may be set to 01, indicating that detection is still to be performed, but the congestion is not severe. If during the path further congestion is detected, the bits may be set to 11, indicating that congestion is severe, or at least worse than the congestion related to the first detection of congestion. With more than two bits, the value may simply be incremented with each detection of congestion, with higher values indicating more congestion and providing an incentive to select a different path for packets with the same or similar service specifications, or even balance packet traffic between paths to minimize congestion differences.

Figure 5:
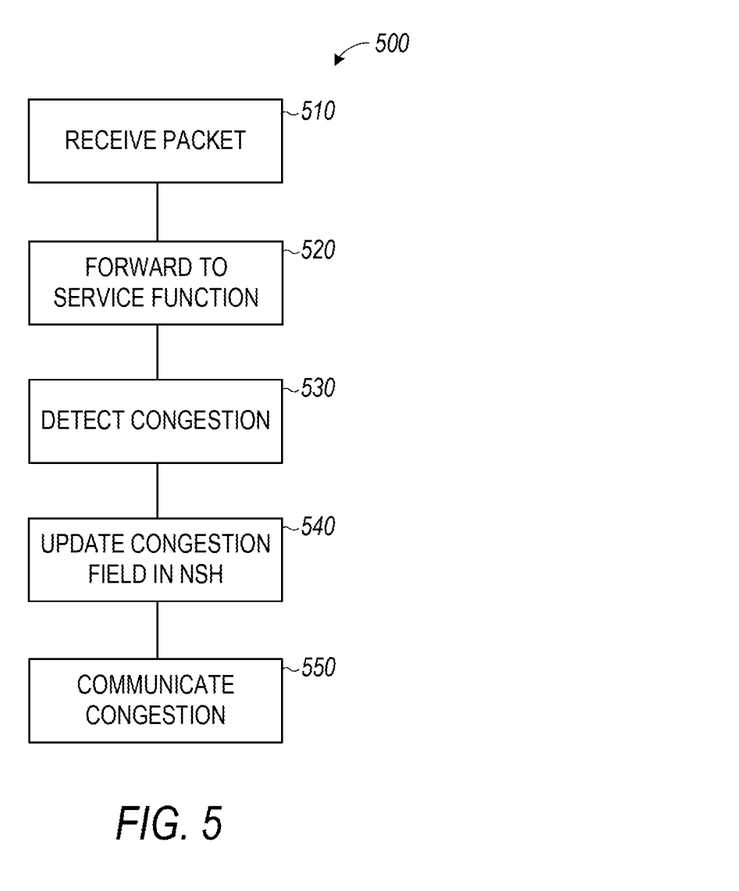
FIG. 5 is a flowchart illustrating a method of tracking congestion in a network service header of a packet progressing through a service function chain according to an example embodiment.

FIG. 5 is a flowchart illustrating a computer implemented method 500 of tracking congestion in a service function chain. Method 500 includes receiving, at operation 510, a packet at a service function forwarding node of the service function chain. The packet includes an information packet, a transport header, and a network service header. At operation 520, the packet is forwarded to a service function associated with the service function forwarding node in accordance with the network service header. Operation 530 detects congestion while processing the packet. In various embodiments, congestion is detected as a function of one or more of the size of output queues of packets for services to be performed, a length of time the packet is in the queue, and a length of time between receiving the packet and forwarding the packet to the output queue or queues responsive to completion of the services. The congestion field in the network service header is updated at operation 540 to indicate congestion was encountered in the service function chain. At 550, that packet, including the congestion indication, is forwarded to the next service function forwarder for further processing of services. The last node B, 150 may communicate that there is congestion back in chain via a single bit in an acknowledgement for example. Other communications of congestion back may be done in further embodiments, using one or more bits to indicate congestion or a level of congestion. The indication of congestion may be used to select other paths through the service chain for the same or similar types of communications, or even to maintain or modify the service function chain by adding more resources to handle the provision of service functions along the same or different paths.

In one embodiment, the congestion field comprises two bits in the network service header of the packet. At least one non-zero bit in the congestion field signifies that congestion tracking is active for the packet.

Updating the congestion field may include incrementing a value represented by the congestion field, and wherein a higher congestion field value indicates higher congestion.

The network service header in one embodiment includes a service path identifier specifying a service path through the service function chain. The service path identifier is modifiable to specify a different service path responsive to the congestion field being representative of congestion.

The service function forwarding node may be associated with multiple instances of service function nodes for performing service on the packet. The service function chain in one embodiment includes a first node that receives a packet to be transferred between a source and a target, wherein the first node creates the network service header, and a last node that strips off the network service header and communicates the indication of congestion back toward the first node. The first node A 110 may modify a path of the packet through the service function chain as a function of the indication of congestion.

Figure 6:
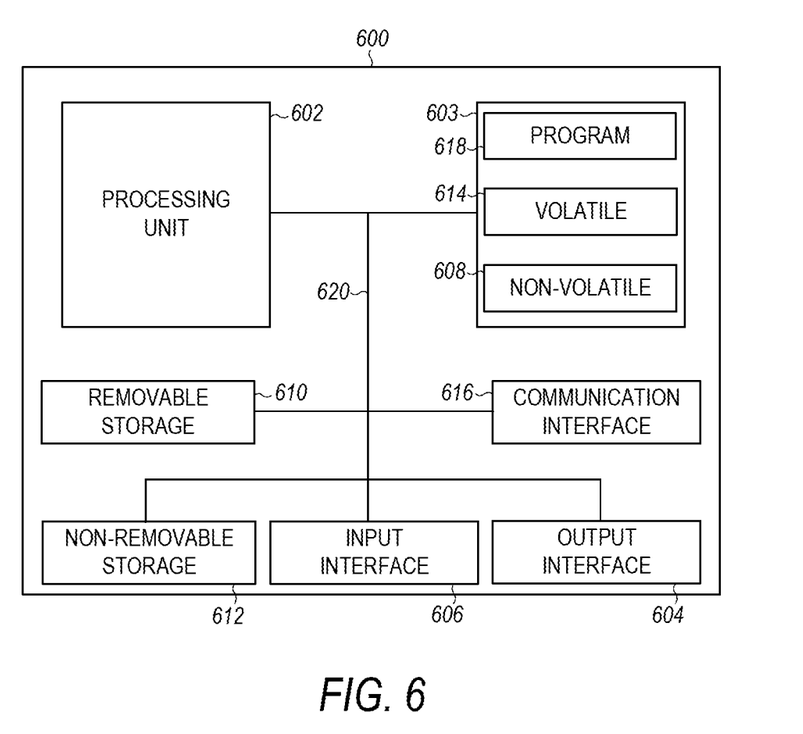
FIG. 6 is a block diagram illustrating circuitry for clients, servers, cloud based resources for implementing algorithms and performing methods according to example embodiments.

FIG. 6 is a block diagram illustrating circuitry for tracking congestion in a service function chain by use a network service header. The circuitry may be used to implement one or more of the SFF or SF nodes in various embodiments and for performing methods according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, or other computing device including the same or similar elements as illustrated and described with regard to FIG. 6. Devices, such as smartphones, tablets, and smartwatches, are generally collectively referred to as mobile devices or user equipment. Further, although the various data storage elements are illustrated as part of the computer 600, the storage may also or alternatively include cloud-based storage accessible via a network, such as the Internet or server based storage.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620. Computer-readable instructions stored on a computer-readable medium are executable by the processing unit 602 of the computer 600, such as a program 618. The program 618 in some embodiments comprises software that, when executed by the processing unit 602, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 618 may be used to cause processing unit 602 to perform one or more methods or algorithms described herein. In one embodiment, processing unit 602 comprises a single integrated circuit processor configured to execute instructions stored in memory. In another embodiment, processing unit 602 comprises a plurality of processors such as processors of a multi-core processor having a plurality of processors. In another embodiment, processing unit 602 may comprises an application specific processor and may further comprises field programmable gate array or even dedicated circuitry.

Although a few embodiments have been described detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed:

1. A computer-implemented method for tracking congestion in a service function chain, the method comprising:
receiving a packet at a service function forwarding node of the service function chain, the packet having an information packet, a transport header, and a network service header, wherein the network service header includes a service path identifier specifying a service path through the service function chain;
forwarding the packet to a service function in the service function chain in accordance with the network service header;
detecting congestion exists in the service function chain; and
updating a congestion field in the network service header to indicate congestion was encountered in the service function chain by incrementing a value represented by the congestion field as a function of a size of an output port queue of the service function forwarding node corresponding to the service function, a length of time the packet is in the output port queue, and a length of time between receiving the packet and forwarding the packet to the output port queue in response to completion of the service function, wherein a higher congestion field value indicates higher congestion.

2. The method of claim 1 wherein the congestion field comprises two bits in the network service header of the packet.

3. The method of claim 2 wherein at least one non-zero bit in the congestion field signifies that congestion tracking is active for the packet.

4. The method of claim 1 wherein the service path identifier is modifiable to specify a different service path responsive to the congestion field being representative of congestion.

5. The method of claim 1 wherein the service function forwarding node is coupled to multiple instances of service functions for performing services on the packet and wherein detecting congestion exists is performed as a function of an output port queue of the service function forwarding node corresponding to at least one of the service function instances.

6. The method of claim 1 wherein the service function chain comprises a first node that receives the packet to be transferred between a source and a target, wherein the first node creates the network service header, and a last node that strips off the network service header and communicates the indication of congestion back toward the first node.

7. The method of claim 6 wherein the first node modifies a path of the packet through the service function chain as a function of the indication of congestion.

8. A device comprising:
a memory storage comprising instructions; and
one or more processors in communication with the memory storage, wherein the one or more processors execute the instructions to perform operations for tracking congestion in a service function chain, the operations comprising:
receiving a packet at a service function forwarding node of the service function chain, the packet having an information packet, a transport header, and a network service header, wherein the network service header includes a service path identifier specifying a service path through the service function chain;
forwarding the packet to a service function in the service function chain in accordance with the network service header;
detecting congestion exists in the service function chain; and
updating a congestion field in the network service header to indicate congestion was encountered in the service function chain by incrementing a value represented by the congestion field as a function of a size of an output port queue of the service function forwarding node corresponding to the service function, a length of time the packet is in the output port queue, and a length of time between receiving the packet and forwarding the packet to the output port queue in response to completion of the service function, wherein a higher congestion field value indicates higher congestion.

9. The device of claim 8 wherein the congestion field comprises two bits in the network service header of the packet.

10. The device of claim 9 wherein at least one non-zero bit in the congestion field signifies that congestion tracking is active for the packet.

11. The device of claim 8 wherein the network service header includes a service path identifier specifying a service path through the service function chain wherein the service path identifier is modifiable to specify a different service path responsive to the congestion field being representative of congestion.

12. The device of claim 8 wherein the service function forwarding node is coupled to multiple instances of service function nodes for performing services on the packet and wherein detecting congestion is performed as a function of an output port queue of the service function forwarding node corresponding to at least one of the service function instances.

13. The device of claim 8 wherein the service function chain comprises a first node that receives the packet to be transferred between a source and a target, wherein the first node creates the network service header, and a last node that strips off the network service header and communicates the indication of congestion back toward the first node and wherein the first node modifies a path of the packet through the service function chain as a function of the indication of congestion.

14. A non-transitory computer-readable media storing computer instructions for tracking congestion in a service function chain, that when executed by one or more processors, cause the one or more processors to perform the steps of:
receiving a packet at a service function forwarding node of the service function chain, the packet having an information packet, a transport header, and a network service header, wherein the network service header includes a service path identifier specifying a service path through the service function chain;
forwarding the packet to a service function in the service function chain in accordance with the network service header;
detecting congestion exists in the service function chain; and updating a congestion field in the network service header to indicate congestion was encountered in the service function chain by incrementing a value represented by the congestion field as a function of a size of an output port queue of the service function forwarding node corresponding to the service function, a length of time the packet is in the output port queue, and a length of time between receiving the packet and forwarding the packet to the output port queue in response to completion of the service function, wherein a higher congestion field value indicates higher congestion.

15. The non-transitory computer-readable media of claim 14 wherein the congestion field comprises two bits in the network service header of the packet, wherein at least one non-zero bit in the congestion field signifies that congestion tracking is active for the packet.

16. The non-transitory computer-readable media of claim 14 wherein the service function chain comprises a first node that receives the packet to be transferred between a source and a target, wherein the first node creates the network service header, and a last node that strips off the network service header and communicates the indication of congestion back toward the first node and wherein the first node modifies a path of the packet through the service function chain as a function of the indication of congestion.

* * * * *